(12) United States Patent
Uehara

(10) Patent No.: US 6,729,453 B2
(45) Date of Patent: May 4, 2004

(54) LOCKUP DEVICE FOR A FLUID-TYPE TORQUE TRANSMISSION DEVICE

(75) Inventor: Hiroshi Uehara, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/282,064

(22) Filed: Oct. 29, 2002

(65) Prior Publication Data

US 2003/0089566 A1 May 15, 2003

(30) Foreign Application Priority Data

Nov. 13, 2001 (JP) .............................. 2001-347262

(51) Int. Cl.[7] .............................................. F16H 45/02
(52) U.S. Cl. ...................... 192/3.3; 192/70.17; 192/212
(58) Field of Search ............................ 192/3.29, 3.3, 192/70.17, 109 R, 212; 464/68

(56) References Cited

U.S. PATENT DOCUMENTS 5,964,329 A * 10/1999 Kawaguchi et al. ......... 192/3.3
6,394,243 B1 * 5/2002 Sasse ......................... 192/3.29
6,464,054 B2 * 10/2002 Fukunaga et al. ......... 192/3.29

* cited by examiner

Primary Examiner—Richard M. Lorence
(74) Attorney, Agent, or Firm—Shinjyu Global IP Counselors, LLP

(57) ABSTRACT

A lockup device 1 is disposed inside a fluid chamber between a front cover 3 and a turbine 4 and provided with a clutch-purpose friction plate 12, a pair of drive the plates 13 and 14, a driven plate 15, and coil springs 16. The friction plate 12 can be coupled with the front cover 3. An extended part 18 extends from one of the plates 13 and 14 toward the other and engages with the inside circumferential edge of the friction plate 12 such that the friction plate cannot rotate but can move in the axial direction relative to the extended part. The driven plate 15 is fixed to the turbine 4. The coil springs 16 are compressed between pair of drive the plates 13 and 14 and the driven plate 15 when the pair of drive plates and the driven plate rotate relative to each other.

19 Claims, 7 Drawing Sheets

LOCKUP DEVICE FOR A FLUID-TYPE TORQUE TRANSMISSION DEVICE

BACKGROUND OF THE INVENTION

1. Field of the Invention

The present invention relates to a lockup device. More specifically, the present invention relates to a lockup device used in a torque converter or other fluid-type torque transmission device.

2. Background Information

A conventional torque converter has a torus part having three types of bladed wheels, typically an impeller, a turbine, and a stator. The torque converter transmits torque by means of an operating fluid contained therein. The impeller is fixed to a front cover, which is coupled to an input-side rotating body. The turbine is driven by the working fluid flowing from the impeller and is coupled to an output member.

Inside some conventional torque converters, a lockup device is arranged in the space between the turbine and the front cover. The lockup device serves to transmit torque directly from the front cover to the output member. This kind of lockup device is generally equipped with a piston that is coupled to a turbine shell or other output member. A friction member is fixed to a lateral surface of the piston. When the friction member presses against the friction surface of the front cover, the torque from the front cover is mechanically transmitted to the output member.

In this example of the prior art, the lockup device has only one friction surface and sometimes, when the engine torque is large, the torque transmission capacity of the lock up device is insufficient. In response to this problem, lockup devices have been made that use a multiple plate clutch to increase the torque transmission capacity. This kind of lockup device is provided with, for example, a damper mechanism, a friction plate, and a piston. The friction plate engages with an outside circumferential part of the damper mechanism in such a manner that it can move in the axial direction. Further, the piston is provided to press the friction plate against a friction surface of the front cover or a plate fixed to the front cover. The damper mechanism has, for example, a plurality of coil springs, a pair of drive plates for supporting the coil springs in the axial and rotational directions, and a driven plate disposed between the drive plates and coupled to the turbine. The outer circumferential parts of the two drive plates are fixed together by, for example, a plurality of stop pins. Further, an engaging ring member is fixed on the outside circumferential surface of the drive plates. The friction plate engages with the engaging member in such a manner that it cannot rotate but can move in the axial direction relative thereto.

The radial dimension of the lockup device just described is relatively large because the stop pins and engaging ring are arranged on an outside circumferential part of the damper mechanism.

In view of the above, there exists a need for a lockup device for a fluid-type torque transmission device that overcomes the above-mentioned problems in the prior art. This invention addresses this need in the prior art as well as other needs, which will become apparent to those skilled in the art from this disclosure.

SUMMARY OF THE INVENTION

An object of the present invention is to save space in a lockup device that has a friction plate arranged on the outside circumferential part of the damper mechanism for securing torque transmission capacity.

A lockup device in accordance with a first aspect of a preferred embodiment of the present invention is used in a fluid-type torque transmission device. The fluid-type torque transmission device has a front cover, an impeller, and a turbine. The impeller is fixed to the front cover so as to form a fluid chamber. Further, the turbine faces the impeller inside the fluid chamber. The lockup device is disposed inside the fluid chamber in the space between the front cover and the turbine. Further, the lockup device is provided with a clutch-purpose friction plate, a pair of drive members, a driven member, and an elastic member. The clutch-purpose friction plate can couple with the front cover so as to rotate integrally. The pair of drive members is a pair of disk-shaped members, first and second disk-shaped members, disposed so as to be spaced axially apart from each other. The drive members have a cylindrical part that extends from the outside circumferential edge of the first disk-shaped member toward the second disk-shaped member. The cylindrical part engages with the inside circumferential edge of the friction plate such that the friction plate cannot rotate but can move in the axial direction relative thereto. The driven member is fixed to the turbine. The elastic member is compressed by the pair of drive members and the driven member when the drive members and driven member rotate relative to each other.

In this lockup device, the friction plate engages with the cylindrical part of a drive member and the pair of drive members is not provided with a member for supporting the friction plate. Consequently, in the case of a lockup device having a friction plate provided on the outside of a damper mechanism, the radial dimension of the entire device can be made smaller relative to conventional devices.

A lockup device for a fluid-type torque transmission device in accordance with a second aspect of the present invention is the lockup device of the first aspect, having a first and a second set of protrusions and recessions. The first set of protrusions and recessions is aligned in the circumferential direction and is formed on the outside circumferential surface of the cylindrical part. The second set of protrusions and recessions is aligned in the circumferential direction and engages with the outside circumferential surface of the cylindrical part. The second set of protrusions and recessions is formed on the inside circumferential edge of the friction plate.

A lockup device for a fluid-type torque transmission device in accordance with a third aspect of the present invention is the lockup device of the first or second aspect, wherein a fixing part is formed on a tip end of the cylindrical part. The fixing part is bent radially inward and fixed to the second disk-shaped member.

In this lockup device the conventional stop pins can be omitted because a fixing part is provided on the tip end of the cylindrical part. Consequently, the radial dimension of the entire lockup device can be made even smaller.

A lockup device for a fluid-type torque transmission device in accordance with a fourth aspect of the present invention is the lockup device of the first or second aspect, wherein a fixing part is formed on the outside circumferential edge of the second disk-shaped member. The fixing part extends in the axial direction inside the cylindrical part and is fixed to the first disk-shaped member.

In this lockup device the conventional stop pins can be omitted because a fixing part is provided on the outside circumferential edge of the second disk member.

Consequently, the radial dimension of the entire lockup device can be made even smaller.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

1. First Embodiment (1) Constitution

Figure 1:
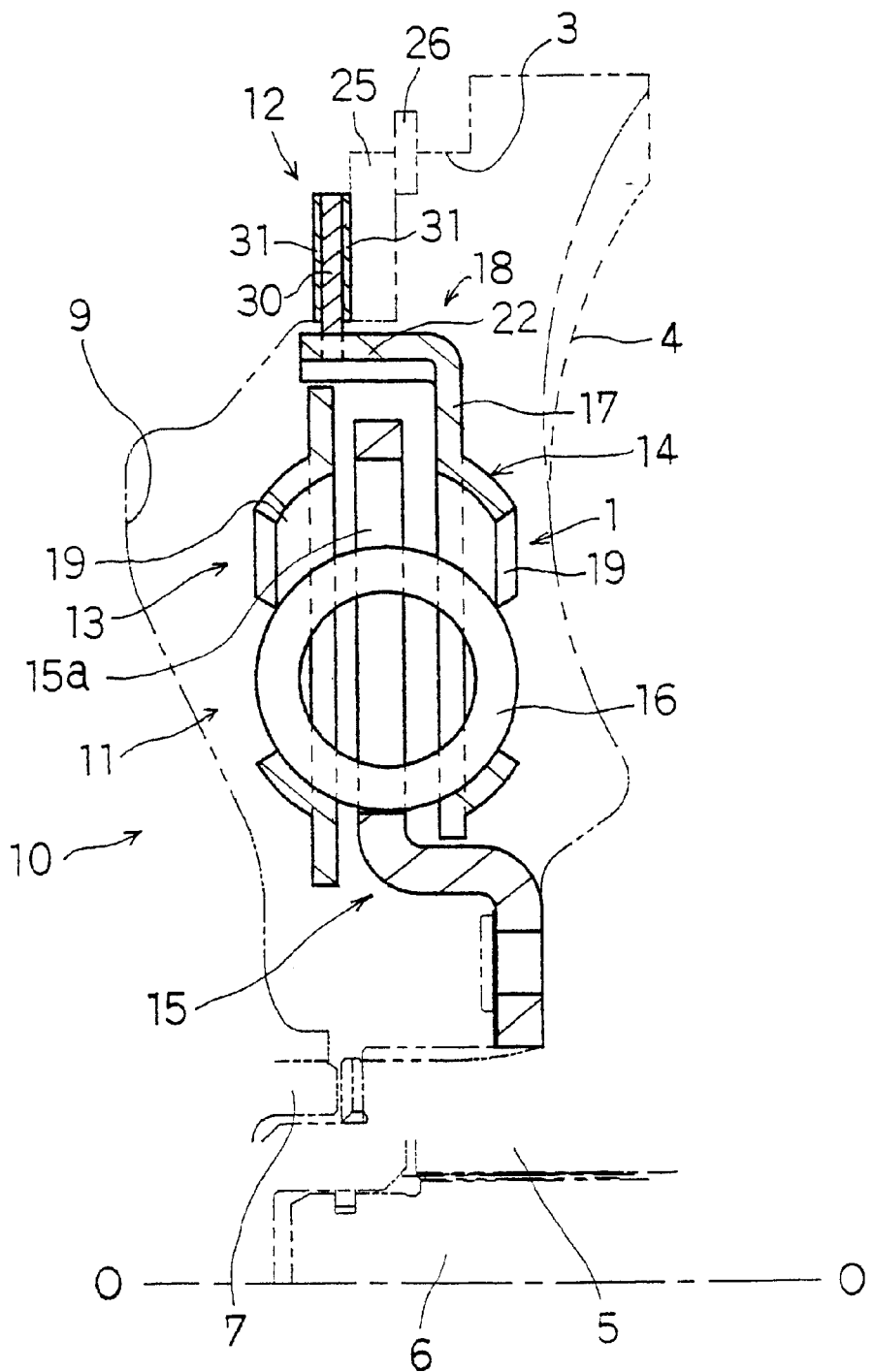
FIG. 1 is a partial vertical cross-sectional schematic view of a torque converter lockup device in accordance with a preferred embodiment of the present invention.
Figure 1A:
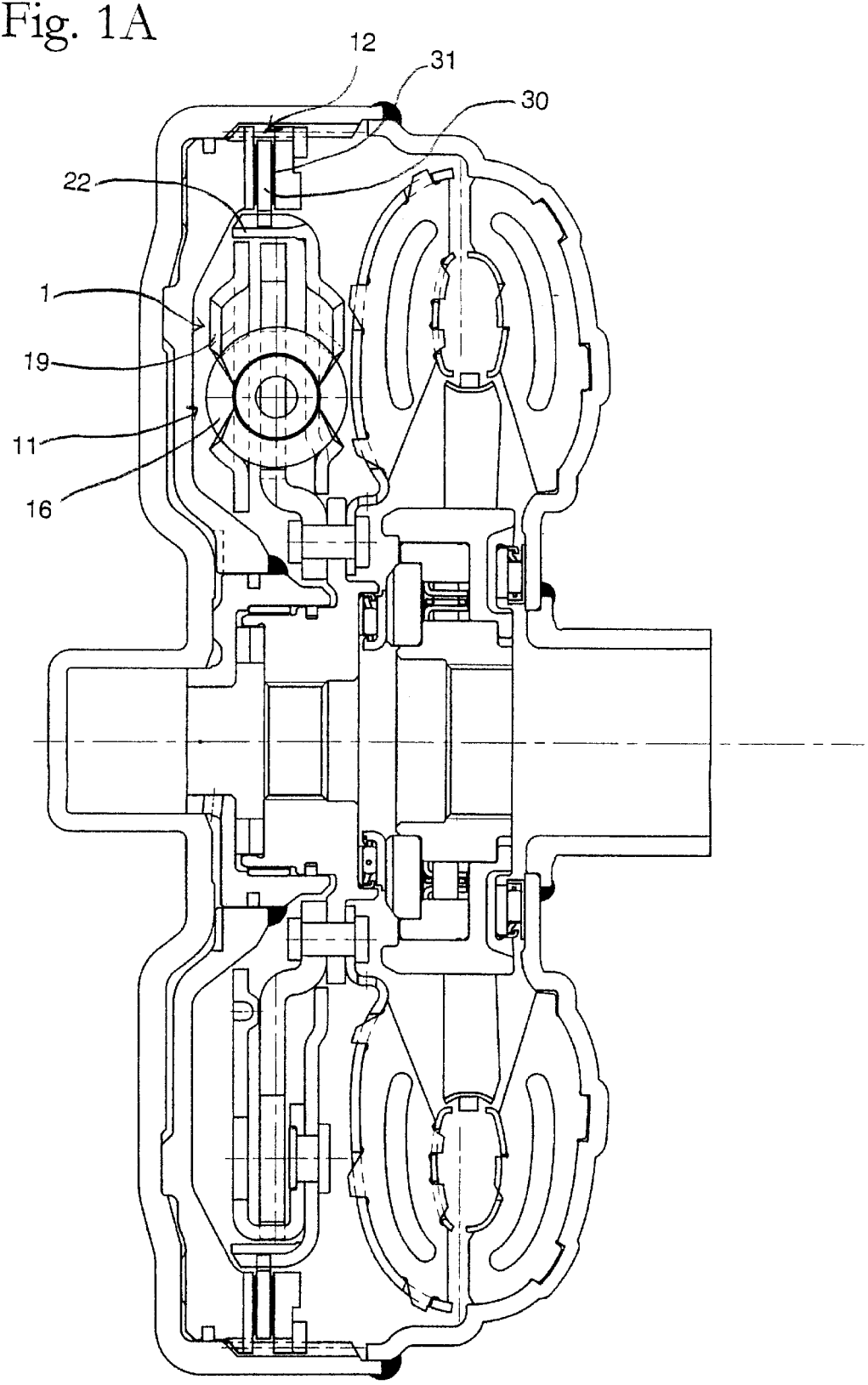
FIG. 1A is a vertical cross-sectional schematic view showing how the torque converter lockup device may be incorporated into a torque converter and have an inner spring located inside an outer spring.

FIG. 1 is a partial, vertical cross-sectional, schematic view of a torque converter that utilizes an embodiment of the present invention. In the figure, line O—O is the rotational center axis of the torque converter.

The torque converter chiefly has a torus part and a lockup device 1. A front cover 3, which can couple with the engine side (engine not shown), is provided. The front cover 3 has a cylindrical projection on the radially outward side thereof. Further, an impeller shell of an impeller is fixed to this projection. The front cover 3 and impeller shell form an operating oil chamber or fluid chamber that is filled with operating oil.

The torus part chiefly has the impeller, a turbine 4, and a stator. A plurality of impeller blades is fixed to the inside of the impeller shell of the impeller. An inner circumferential end part of the impeller shell is fixed to an impeller hub. The turbine 4 is disposed in a position facing opposite the impeller. The turbine 4 has a turbine shell and a plurality of turbine blades fixed to the turbine shell. The inner circumferential end part of the turbine shell is welded to the outside of a turbine hub 5. The inside of the turbine hub 5 is provided with splines that engage with a transmission input shaft 6. A stator is disposed between the inside of the impeller and the inside of the turbine 4. The stator serves to adjust the direction of the operating oil returning to the impeller from the turbine 4. Further, the stator has an annular stator carrier and a plurality of stator blades provided on the outside circumferential surface of the annular stator carrier. The stator carrier is coupled to an inner race via a one-way clutch. The inner race is coupled to a stationary shaft (not shown) that extends from the housing side (right side in the figure).

The lockup device 1 serves to couple mechanically the front cover 3 and the turbine 4 together and chiefly has a clutch function and a damper function. The clutch function is provided for engaging and disengaging a mechanical connection, and the damper function is provided for the function of absorbing and damping torque fluctuations. The lockup device 1 is disposed between the front cover 3 and the turbine shell of the turbine 4. The lockup device 1 chiefly has a disk-shaped piston 9 and a damper disk assembly 10.

A hydraulic chamber into which operating oil is supplied is formed between the piston 9 and the front cover 3. On the radially-facing outside circumferential end of the piston 9 are formed engaging teeth that engage with a plurality of engaging projections provided on the inside circumferential surface of the cylindrical projection of the front cover 3. The engaging projections are equally spaced in the circumferential direction and run parallel to centerline O—O. Due to this engagement, the piston 9 rotates integrally with the front cover 3 but can move freely in the axial direction with respect to the front cover. The inside circumferential surface of the piston 9 is supported in both the rotational and axial directions on the outside circumferential surface of a hub 7, which is fixed at the center of the front cover 3.

The damper disk assembly 10 chiefly has an elastic coupling part 11 and a friction plate 12. The elastic coupling part 11 has a pair of drive plates 13 and 14, a driven plate 15, and a plurality of coil springs 16. The pair of drive plates 13 and 14 are made of a first plate 13 and a second plate 14. The first plate 13 is positioned closer to the engine relative to the second plate 14. Thus, the second plate 14 is positioned closer to the transmission relative to the first plate 13. Both plates 13 and 14 are disk-shaped members arranged with a prescribed axial spacing therebetween. The plates 13 and 14 are provided with a plurality of window parts 19 arranged in the circumferential directions. The window parts 19 constitute a structure that supports the coil springs 16 (discussed later) in the axial and circumferential directions. The window parts 19 have cut and raised parts that hold the coil springs 16 in the axial direction of the torque converter and touch against both circumferentially facing ends of each coil spring 16.

The structure of the second plate 14 is described in further detail with reference to FIGS. 2 and 3. Although FIG. 3 discloses an alternate embodiment of the present invention, the portions described herein are applicable to the first embodiment as well. There are preferably four window parts 19 aligned in the circumferential direction. The window parts 19 are formed in a disk-shaped main body 17 of the second plate 14. Further, holes 20 for rivets 27 (discussed later) are formed in the disk-shaped main body 17 at positions located circumferentially between the window parts 19. An extended part 18 that extends toward the engine, i.e., toward the first plate 13, in the axial direction is formed on the outside circumferential edge of the disk-shaped main body 17. The tip end of the extended part 18 extends roughly to the outside circumference of the first plate 13. The extended part 18 has a cylindrical shape that exists around the entire circumference of the disk-shaped main body 17.

At the extended part 18, the main surfaces of the plate 14 face in both radial directions. In other words, the thickness of the extended part 18 in the radial direction is preferably the same as the thickness of the plate 14 in the axial direction. Protrusions and recessions are arranged continuously around the entire circumference of the extended part 18. The protrusions and recessions are preferably formed by drawing and protrude and recess relative to the radial direction. As a result, the outside circumferential surface of the extended part 18 is provided with a plurality of tooth parts 22, each of which has the shape of a drawn mating tooth. Each tooth part 22 has a radially outward facing surface part 22a and two circumferentially facing surface parts 22b. The tooth parts 22 are joined by tooth bottom surface part parts 22c.

Fixing parts 23, which are bent radially inward, are formed integrally at a plurality of locations around the circumference of the tip edge of the extended part 18. The fixing parts 23 abut against a transmission facing lateral surface of the first plate 13 and are fixed by the rivets 27. Consequently, the plates 13 and 14 are fixed together such that they rotate as a single unit and a constant axial distance between them is maintained. The fixing parts 23 are formed uninterruptedly from tooth bottom surface parts 24 of the tooth parts 22. Compared to the other tooth bottom surface parts 22c, the tooth bottom surface parts 24 are longer in the circumferential direction and positioned closer to the center axis in the radial direction.

Figure 2:
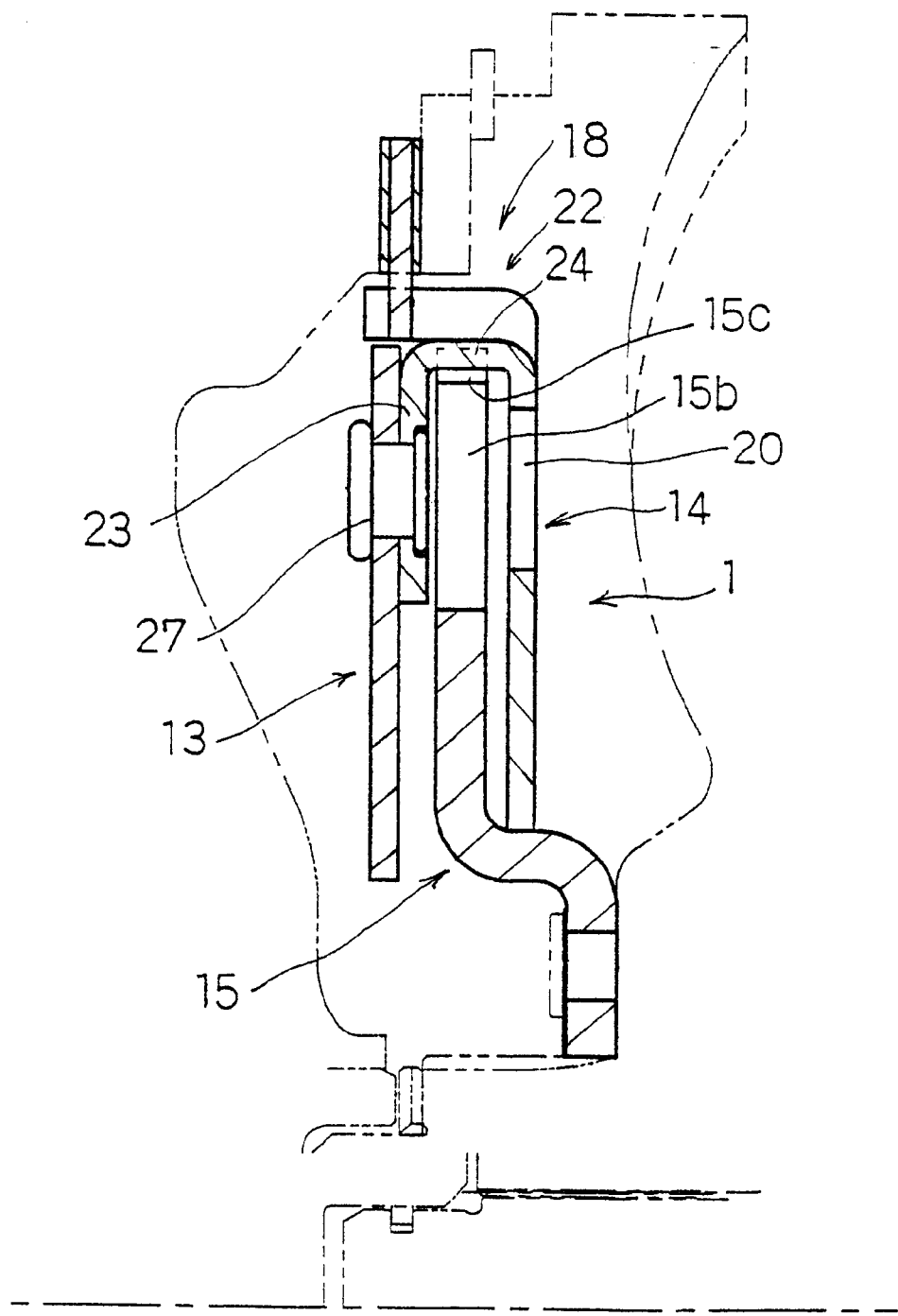
FIG. 2 is an alternate partial vertical cross-sectional schematic view of the torque converter lockup device.

Referring to FIGS. 1 and 2, the driven plate 15 is a disk-shaped member disposed between the plates 13 and 14. The driven plate 15 has a plurality of window holes 15a that extend in the circumferential direction such that the coil springs 16 are arranged inside the window holes 15a. Cut-out parts 15b are formed in the portions of the driven plate 15 located circumferentially between the window holes 15a so that the rivets 27 (discussed later) can pass therethrough in the axial direction. Contact parts 15c are formed on the outside circumferential edge of the driven plate 15. The contact parts 15c are separated from the tooth bottom surface parts 24 in the rotational direction and are capable of touching there against. Thus, in this embodiment, the tooth bottom surface parts 24 and the contact parts 15c preferably constitute the stopper mechanism of the damper mechanism. However, it is also acceptable to use other portions to form the stopper mechanism.

Figure 3:
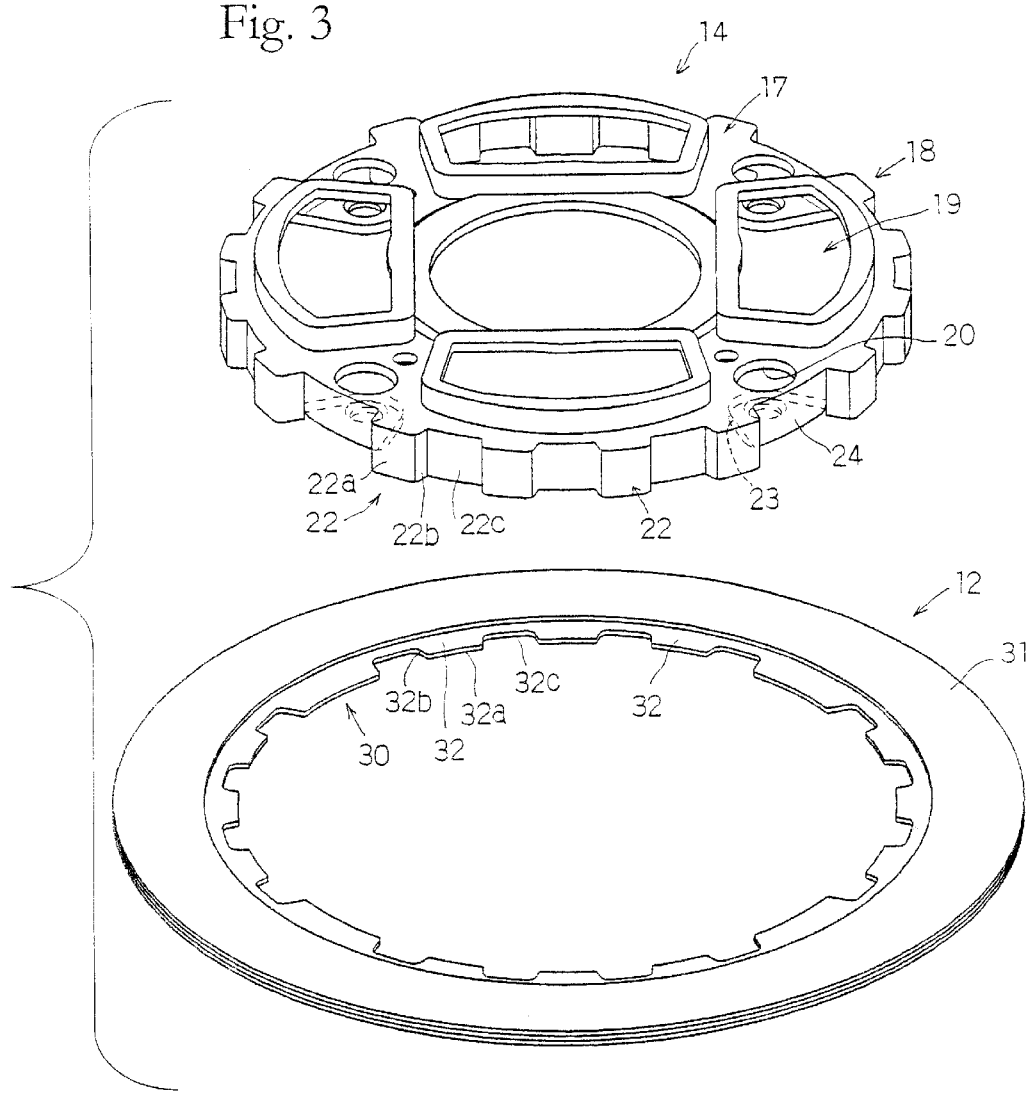
FIG. 3 is a perspective view of a second plate and a friction plate of the torque converter lockup device in accordance with a second preferred embodiment of the present invention.

As seen in FIGS. 1 and 3, the friction plate 12 is preferably a flat annular member that chiefly has a core plate 30 and friction facings 31 and 31 affixed to both axial sides of the outer circumferential section. Engaging teeth 32 that engage with the tooth parts 22 of the extended part 18 are formed on the inside circumferential edge of the core plate 30. The existence of the plurality of engaging teeth 32 means there are a plurality of protrusions and recessions on the inside circumference of core plate 30. Each engaging tooth 32 has a radially inward facing surface part 32a and rotationally facing surface parts 32b on both sides thereof. Tooth bottom surface parts 32c are formed between the engaging teeth 32. The engaging teeth 32 engage with the tooth parts 22 and, as a result, the plate 12 cannot rotate but can move axially with respect to the extended part 18.

A drive washer 25 engages with an engaging section of the inside circumferential surface of a cylindrical projection of the front cover 3 such that the drive washer cannot rotate but can move axially with respect to the engaging section. The drive washer 25 is disposed on the transmission side of the friction plate 12. A snap ring 26 is fixed to the inside circumferential surface of the outside cylindrical part of the front cover 3. The snap ring 26 touches against the outer circumferential section of the drive washer 25 and restricts the axial motion of the drive washer 25 toward the transmission.

(2) Operation

Next the operation of the embodiment is described.

When the engine (not shown) rotates, torque is delivered to the front cover 3 and the impeller rotates together with the front cover 3. The torque is then transmitted to the turbine 4 through the operating oil. The operating oil returning to the impeller from the turbine is adjusted by the stator. The rotation of the turbine 4 is transmitted to the transmission input shaft 6 through the turbine hub 5. In the region where the torque is transmitted by the torus section, a hydraulic pressure control device (not shown) drains the hydraulic pressure from the hydraulic chamber that exists between the piston 9 and the front cover 3. As a result, the piston 9 moves toward the engine in the axial direction and separates from the friction plate 12.

When the torque converter locks up, the hydraulic pressure control device (not shown) supplies operating oil to the hydraulic chamber. As a result, the piston 9 moves toward the transmission in the axial direction and presses the friction plate 12 against the drive washer 25. In this clutch engaging section, both surfaces of the friction plate 12 are frictional engaging surfaces, and, consequently, the torque transmission capacity is larger than in lockup devices having only one frictional engaging surface.

The torque transmitted to the friction plate 12 is delivered to the pair of drive plates 13 and 14. From there, the torque is transmitted to the driven plate 15 through the coil springs 16 and then to the turbine hub 5. The shock and torsional vibrations that occur while the clutch is engaged are softened by the coil springs 16.

(3) Operational Effects

① By using the extended part 18 as the engaging part of the friction plate 12, the radial dimension of the lockup device can be reduced. The radial dimension of the part that supports the friction plate is smaller than in conventional lockup devices because it is not necessary to provide an engaging ring or the like on the outside of the drive plate in order to support the friction plate and because the thickness of the extended part 18 in the radial direction is only about the same as the thickness of the drive plate.

② The following advantages are obtained because the drive plates 13 and 14 are coupled using plate members (stop pins and coupling members are eliminated).

Eliminating the stop pins allows both the weight and the number of parts to be reduced.

Eliminating the stop pins allows the radial dimension of the coupling part to be reduced. That is, the radial dimension of the section where the plates are coupled together is held smaller because the thickness of the extended part 18 in the radial direction is only about the same as the thickness of the drive plate.

Eliminating the stop pins allows the twisting angle of the damper mechanism to be widened and, consequently, a low twisting rigidity can be achieved. That is, the problem of the stop pins restricting the twisting angle is solved and the twisting angle of the damper mechanism can be enlarged.

EFFECTS OF THE INVENTION

In the lockup device of the present invention, the friction plate engages with the cylindrical part of a drive member and there is no special member for supporting the friction plate provided on the pair of drive members. Therefore, in the case of a lockup device having a friction plate provided on the circumferential outside of a damper mechanism, the overall radial dimension of the device can be reduced.

ALTERNATE EMBODIMENTS

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

2. Second Embodiment

Figure 4:
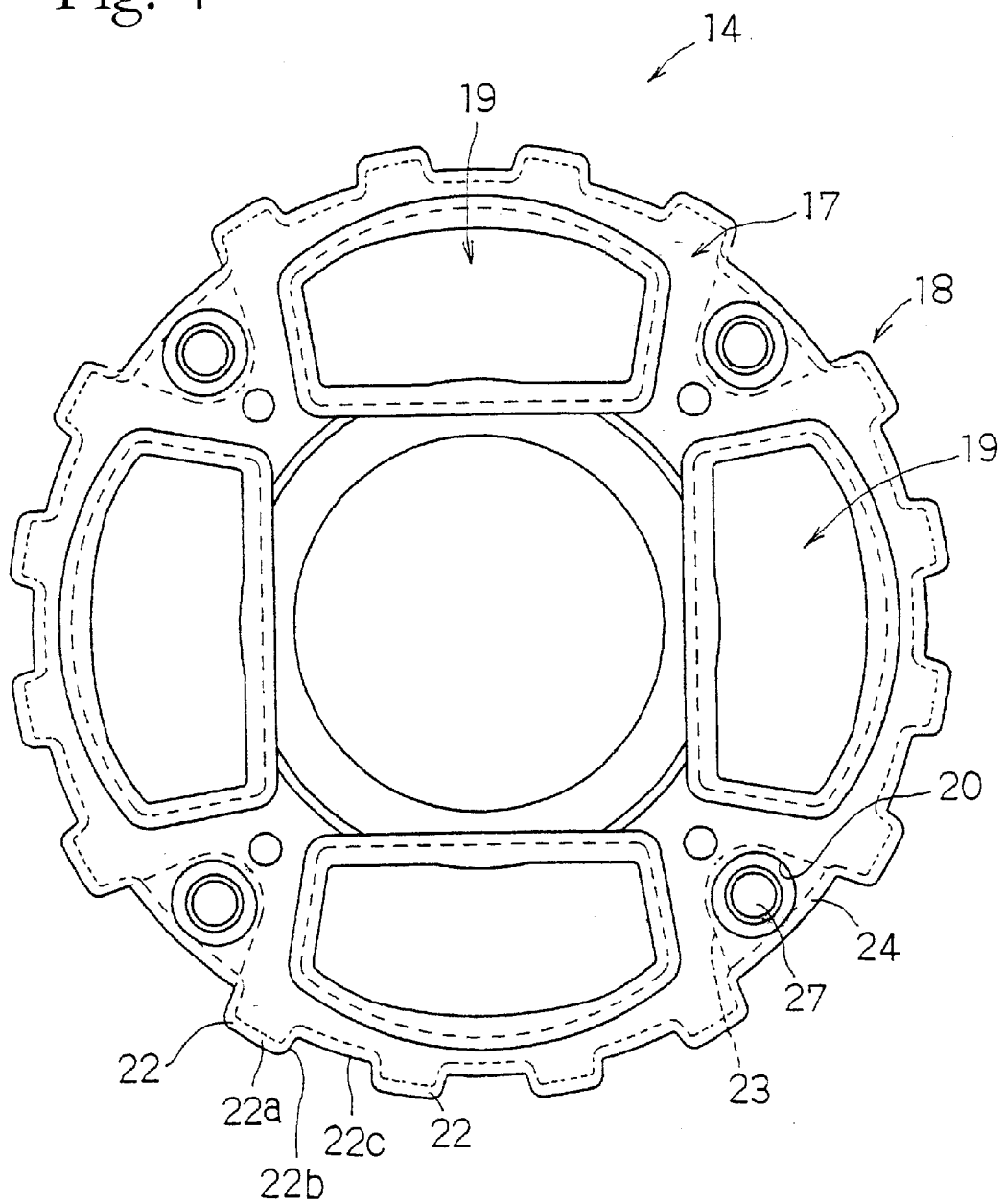
FIG. 4 is an elevational view of the second plate.
Figure 5:
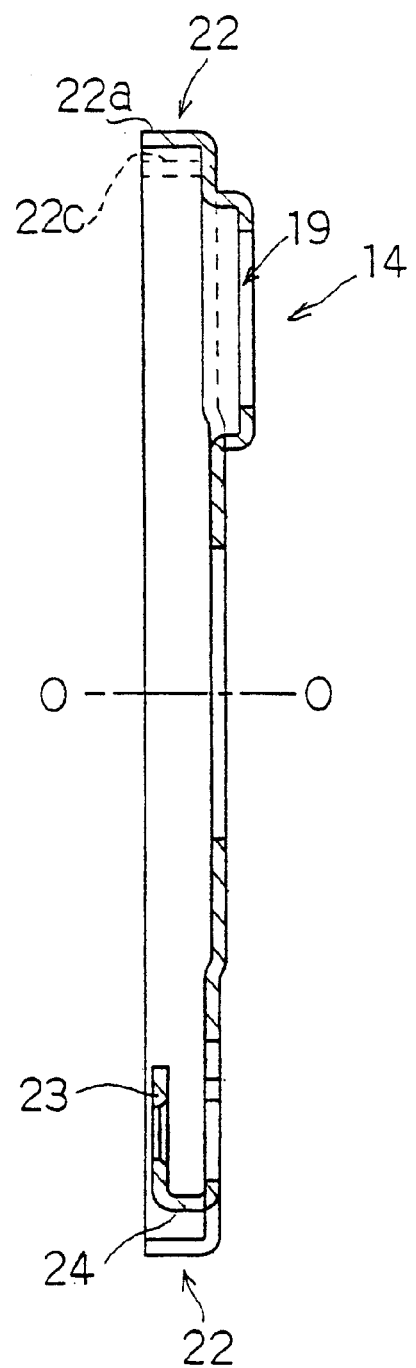
FIG. 5 is a cross-sectional view taken along line V—V of FIG. 4.

The second plate 14 of the drive plates in accordance with a second preferred embodiment of the present invention is shown in FIGS. 3 to 5. Only the shape of the window parts 19 is different from the second plate 14 of the previous embodiment. The shape and function of all other parts are the same as the previous embodiment.

In this embodiment, the edge part of window part 19 is not cut and raised but rather is raised uninterruptedly around the entire periphery of the window hole.

3. Third Embodiment

Figure 6:
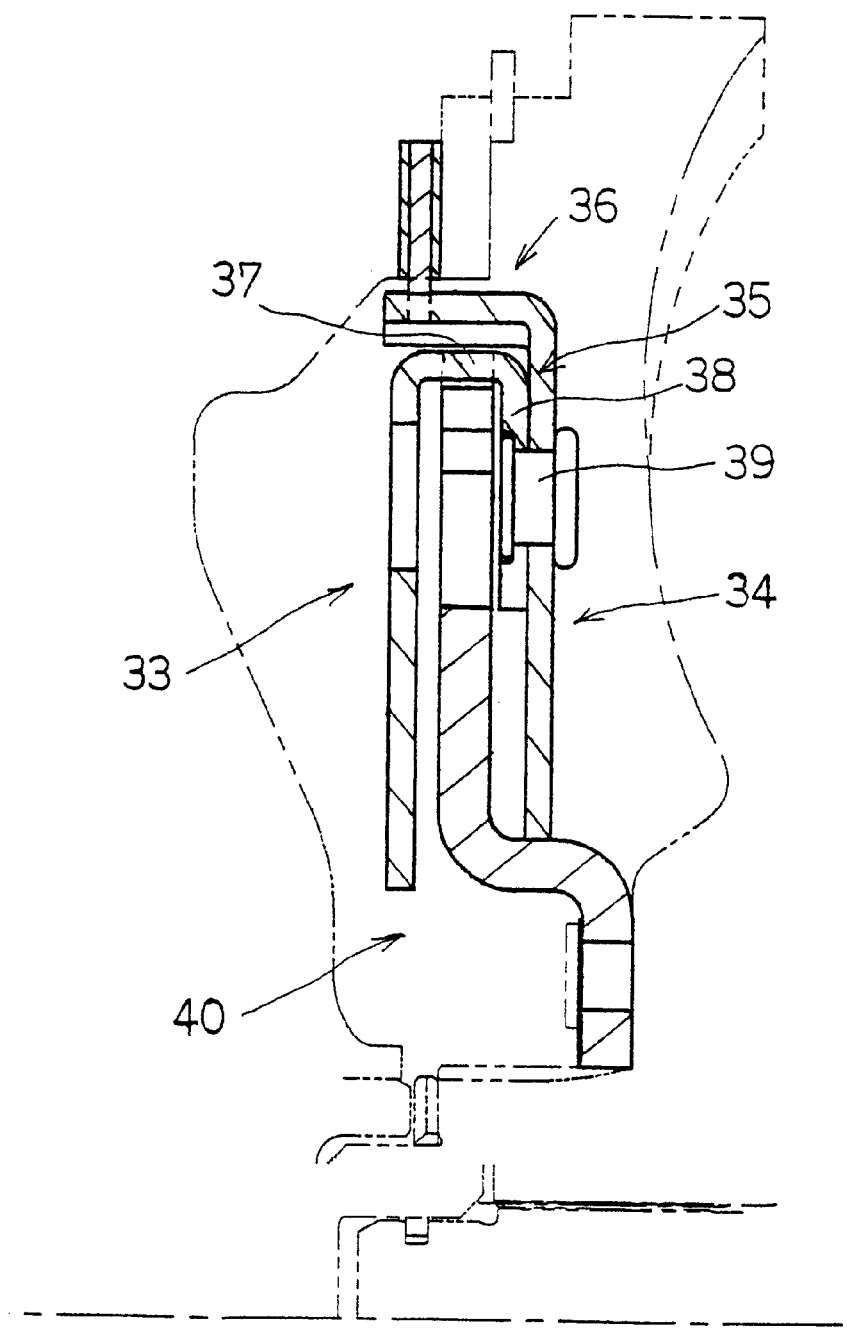
FIG. 6 is a vertical cross-sectional schematic view of a torque converter lockup device in accordance with a third embodiment of the present invention.

As seen in FIG. 6, in accordance with a third preferred embodiment of the present invention, a plurality of fixing parts 35 is formed on the outside circumferential edge of a first plate 33, the plate 13 of the previous embodiments. Each fixing part 35 has an extended part 37 that extends in the axial direction closely adjacent to the inside of the cylindrical extended part 36 of a second plate 34 and a mounting part 38 that extends radially inward from the tip of the extended part. The mounting part 38 touches against the engine-facing lateral surface of the second plate 34 at the outer circumferential portion thereof and is fixed by rivets 39. A driven plate 40 is formed axially between the first plate 33 and the second plate 34. It is also acceptable for the extended part 37 to form a portion of the stopper mechanism as in the previous embodiments.

In this embodiment, a cylindrical part for engaging with the friction plate is formed on one of the drive plates and a fixing part for coupling the plates together is formed on the other drive plate. In this regard, as well, the same or similar effect as the previous embodiments is achieved.

4. Other Embodiments

The lockup device of the present invention can be applied not only to torque converters but also to fluid couplings.

The constituent features of the lockup device are not limited to those of the previously described embodiments. For example, it is also acceptable for the piston to be disposed on the transmission side of the friction plate.

The extended part and fixing parts are formed integrally with the main body of the plates in the embodiments, but it is also acceptable for these parts to be separate plate-like members.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-347262. The entire disclosure of Japanese Patent Application No. 2001-347262 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A fluid-type torque transmission device comprising:
   a front cover;
   an impeller being fixed to said front cover to form a fluid chamber;
   a turbine disposed inside said fluid chamber in a space between said front cover and said impeller; and
   a lockup device comprising,
      a clutch-purpose friction plate being configured to be coupled with said front cover to rotate integrally therewith,
      a pair of drive members comprising,
         first and second disk-shaped members being disposed to be spaced apart from each other in an axial direction,
         a cylindrical part extending from an outside circumferential edge of said second disk-shaped member toward said first disk-shaped member, said cylindrical part engaging with an inside circumferential edge of said friction plate, said friction plate being non-rotatable and axially movable relative to said cylindrical part, and
         a fixing part formed on said cylindrical part of said second disk-shaped member, said fixing part being bent radially inward and fixed to said first-disk shaped member,
      a driven member being fixed to said turbine, and
      an elastic member being configured to be compressed when said pair of drive members and said driven member rotate relative to each other.

2. The fluid-type torque transmission device according to claim 1, wherein
   said cylindrical part has a first set of protrusions and recessions formed on an outside surface thereof, said first set of protrusions and recessions are aligned in a circumferential direction, and
   said friction plate has a second set of protrusions and recessions formed on an inside circumferential edge thereof, said second set of protrusions and recessions are aligned in said circumferential direction and engage with said outside circumferential surface of said cylindrical part.

3. The fluid-type torque transmission device according to claim 1, wherein
   said elastic member is arranged in window parts of said first and second disk-shaped members, said window parts are cut and raised axially from said first and second disk-shaped members.

4. The fluid-type torque transmission device according to claim 2, wherein
said first set of protrusions and recessions comprises at least one fixing part recession and tooth recessions, and said tip end comprises a fixing part recession of said first set of protrusions and recessions.

5. The fluid-type torque transmission device according to claim 4, wherein
said fixing part recession is longer in a circumferential direction than any one of said tooth recessions.

6. The fluid-type torque transmission device according to claim 5, wherein
said fixing part recession extends radially closer to an axis of rotation of said fluid-type torque transmission device than any one of said tooth recessions.

7. The fluid-type torque transmission device according to claim 4, wherein
said fixing part recession extends radially closer to an axis of rotation of said fluid-type torque transmission device than any one of said tooth recessions.

8. The fluid-type torque transmission device according to claim 2, wherein
said first disk-shaped member has a fixing part formed on an outside circumferential edge thereof, and said fixing part extends in an axial direction radially inside said cylindrical part and is fixed to said second disk-shaped member.

9. The fluid-type torque transmission device according to claim 1, wherein
said elastic member is arranged in window parts of said first and second disk-shaped members, said window parts are axially raised uninterruptedly around an entire periphery of said window part.

10. A fluid-type torque transmission device comprising:
a front cover;
an impeller being fixed to said front cover to form a fluid chamber;
a turbine disposed inside said fluid chamber in a space between said front cover and said impeller; and
a lockup device comprising,
a clutch-purpose friction plate being configured to be coupled with said front cover to rotate integrally therewith,
a pair of drive members comprising,
first and second disk-shaped members being disposed to be spaced apart from each other in an axial direction,
a cylindrical part extending from an outside circumferential edge of said second disk-shaped member toward said first disk-shaped member, said cylindrical part engaging with an inside circumferential edge of said friction plate, said friction plate being non-rotatable and axially movable relative to said cylindrical part, and
said first disk-shaped member having an extended part formed on an outside circumferential edge thereof, said extended fixing part extending in an axial direction radially inside said cylindrical part, and a fixing part extending radially inward from said extended part and being fixed to said second disk-shaped member,
a driven member being fixed to said turbine, and
an elastic member being configured to be compressed when said pair of drive members and said driven member rotate relative to each other.

11. A lockup device for use in a fluid-type torque transmission having a front cover, an impeller forming a fluid chamber with the front cover, and a turbine, comprising:

a clutch-purpose friction plate being configured to be coupled with said front cover to rotate integrally therewith;
a pair of drive members comprising,
first and second disk-shaped members being disposed to be spaced apart from each other in an axial direction,
a cylindrical part extending from an outside circumferential edge of said second disk-shaped member toward said first disk-shaped member, said cylindrical part engaging with an inside circumferential edge of said friction plate, said friction plate being non-rotatable and axially movable relative to said cylindrical part, and
a fixing part formed on said cylindrical part of said second disk-shaped member, said fixing part being bent radially inward and fixed to said first-disk shaped member;
a driven member being fixed to said turbine; and
an elastic member being configured to be compressed when said pair of drive members and said driven member rotate relative to each other.

12. The lockup device according to claim 11, wherein
said cylindrical part has a first set of protrusions and recessions formed on an outside surface thereof, said first set of protrusions and recessions are aligned in a circumferential direction, and
said friction plate has a second set of protrusions and recessions formed on an inside circumferential edge thereof, said second set of protrusions and recessions are aligned in said circumferential direction and engage with said outside circumferential surface of said cylindrical part.

13. The lockup device according to claim 12, wherein
said first set of protrusions and recessions comprises at least one fixing part recession and tooth recessions, and said tip end comprises a fixing part recession of said first set of protrusions and recessions.

14. The lockup device according to claim 13, wherein
said fixing part recession is longer in a circumferential direction than any one of said tooth recessions.

15. The lockup device according to claim 14, wherein
said fixing part recession extends radially closer to an axis of rotation of said fluid-type torque transmission device than any one of said tooth recessions.

16. The lockup device according to claim 13, wherein
said fixing pad recession extends radially closer to an axis of rotation of said fluid-type torque transmission device than any one of said tooth recessions.

17. The lockup device according to claim 12, wherein
said first disk-shaped member has a fixing pad formed on an outside circumferential edge thereof, and said fixing part extends in an axial direction radially inside said cylindrical part and is fixed to said second disk-shaped member.

18. The lockup device according to claim 11, wherein
said elastic member is arranged in window parts of said first and second disk-shaped members, said window pads are cut and raised axially from said first and second disk-shaped members.

19. The lockup device according to claim 11, wherein
said elastic member is arranged in window parts of said first and second disk-shaped members, said window parts are axially raised uninterruptedly around an entire periphery of said window part.

* * * * *